United States Patent
Li et al.

(10) Patent No.: US 11,287,552 B2
(45) Date of Patent: Mar. 29, 2022

(54) LENS MODULE AND LENS PROTECTIVE FILM

(71) Applicant: TRIPLE WIN TECHNOLOGY (SHENZHEN) CO. LTD., Shenzhen (CN)

(72) Inventors: Kun Li, Guangdong (CN); Ming Li, Jincheng (CN); Shin-Wen Chen, New Taipei (TW); Long-Fei Zhang, Guangdong (CN)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 215 days.

(21) Appl. No.: 16/529,924

(22) Filed: Aug. 2, 2019

(65) Prior Publication Data
US 2020/0103561 A1 Apr. 2, 2020

(30) Foreign Application Priority Data
Sep. 27, 2018 (CN) .......................... 201811133518.7

(51) Int. Cl.
*G02B 1/14* (2015.01)
*B32B 3/26* (2006.01)
(Continued)

(52) U.S. Cl.
CPC ................ *G02B 1/14* (2015.01); *B32B 3/266* (2013.01); *B32B 5/18* (2013.01); *B32B 5/32* (2013.01); *B32B 7/12* (2013.01); *B32B 2266/0271* (2013.01); *B32B 2266/12* (2016.11); *B32B 2307/412* (2013.01); *B32B 2571/00* (2013.01)

(58) Field of Classification Search
CPC .. G02B 1/14; G02B 1/16; B32B 3/266; B32B 2266/0271; B32B 2307/412; B32B 2266/12; B32B 2571/00; B32B 7/12; B32B 27/281; B32B 27/36; B32B 25/045; B32B 27/065; B32B 5/32; B32B 27/365; B32B 5/18; B32B 9/00; B32B 9/04; B32B 9/046; B32B 9/045; B32B 27/38; B32B 27/08;
(Continued)

(56) References Cited

U.S. PATENT DOCUMENTS

2013/0162891 A1* 6/2013 Wang .................. H04N 5/2254
348/360

FOREIGN PATENT DOCUMENTS

| CN | 103802422 A | 5/2014 |
|----|-------------|--------|
| CN | 203775279 U | 8/2014 |
| CN | 207752170 U | 8/2018 |

OTHER PUBLICATIONS

Translation to English for CN207752170U via espacenet.com. Accessed Aug. 5, 2021 (Year: 2018).*

* cited by examiner

*Primary Examiner* — Nancy R Johnson
(74) *Attorney, Agent, or Firm* — ScienBiziP, P.C.

(57) ABSTRACT

A lens protective film includes a base layer, a buffer layer, and a protective layer. The buffer layer and the protective layer are laminated on the base layer. The base layer includes a main body and a first handle extending from the main body. An opening is defined in each of the main body and the buffer layer. The openings of the main body and the buffer layer overlap to form the receiving structure. The receiving structure is used to receive a raised part of a lens. The lens protective film can prevent the buffer layer and the protective layer from being broken and generating debris.

10 Claims, 4 Drawing Sheets

(51) Int. Cl.
 *B32B 5/32* (2006.01)
 *B32B 7/12* (2006.01)
 *B32B 5/18* (2006.01)

(58) Field of Classification Search
 CPC .. B32B 3/08; B32B 7/06; B32B 33/00; B32B 2307/50; B65D 81/05; B65D 85/38
 See application file for complete search history.

LENS MODULE AND LENS PROTECTIVE FILM

FIELD

The subject matter of the application relates to a lens module and a lens protective film.

BACKGROUND

Electronic devices may have lenses for capturing images. After the lens has been manufactured, a lens protective film needs to be placed on the lens. The lens protective film not only prevents damage to the lens during subsequent processes, but also prevents dust from entering into the inside of the lens during transportation. In the prior art, the lens protective film on the lens is also needed in an optical test of the lens. However, the optical properties of the lens protective film are generally poor, so that the optical test of the lens may be ineffective. In the prior art, the lens protective film is provided with a handle for pulling the lens protective film on the side away from the lens, but the lens protective film may break during pulling the lens protective film outward, thereby debris may enter into the lens. Debris in the lens will affect imaging quality of the lens.

Therefore, there is room for improvement in the art.

BRIEF DESCRIPTION OF THE DRAWINGS

Implementations of the present disclosure will now be described, by way of embodiments, with reference to the attached figures.

DETAILED DESCRIPTION

Figure 1:
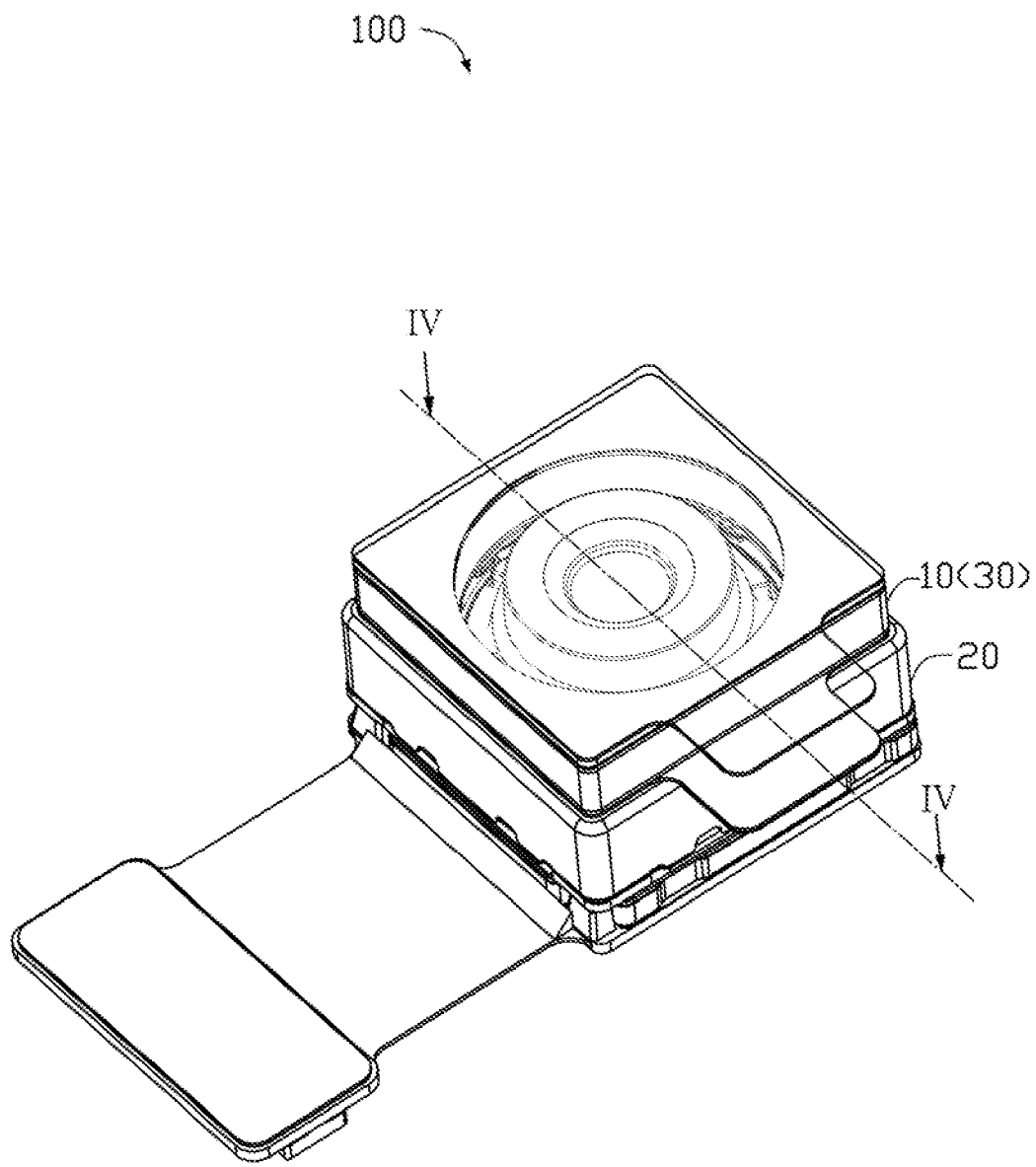
FIG. 1 is a view of an embodiment of a lens module including a lens protective film according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain portions may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

FIG. 1 shows a lens module 100, the lens module 100 includes a lens protective film 10 and a lens 20. The lens protective film 10 is formed on the lens 20. A part of the lens 20 is received in the lens protective film 10. The lens protective film 10 is used not only to prevent damage to the lens during the soldering process, but also avoid dust entering into the inside of the lens during transportation. The lens 20 can be an image acquisition component suitable for a mobile terminal.

Figure 2:
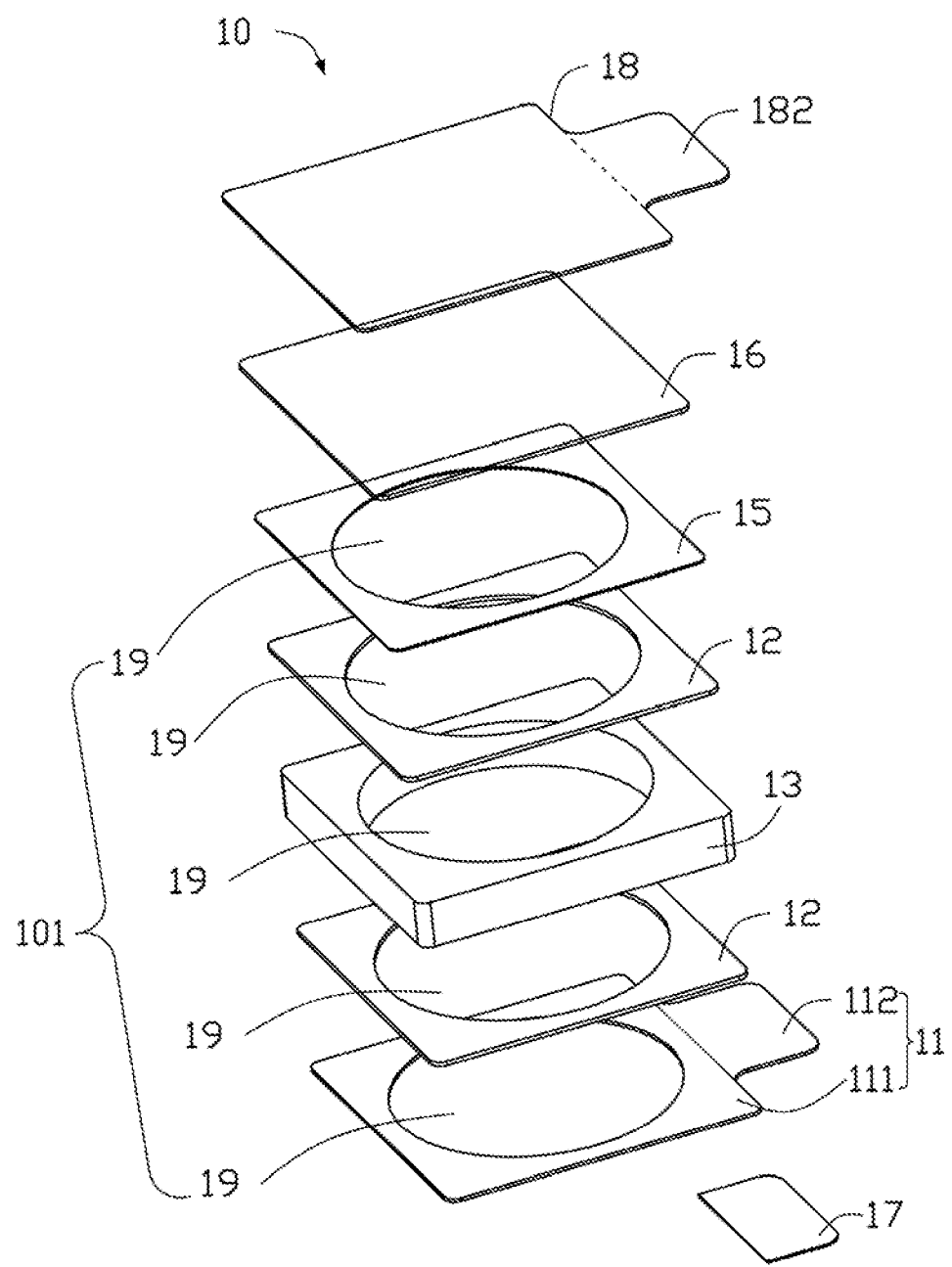
FIG. 2 is an exploded view of the protective film of FIG. 1 in a first embodiment according to the present disclosure.

Referring to FIG. 2, the lens protective film 10 includes a base layer 11, a buffer layer 13, an insulating layer 15, a protective layer 16, and a solder mask layer 18, which are laminated in that order. The lens protective film 10 further includes two adhesive layers 12. The buffer layer 13 connects to the base layer 11 by one of the adhesive layers 12. The insulating layer 15 connects to the buffer layer 13 by another one of the adhesive layers 12. The lens protective film 10 further includes a cover plate 17 formed on one surface of the base layer 11. In at least one embodiment, the cover plate 17 and the protective layer 16 are on opposite surfaces of the base layer 11. An opening 19 is defined in each of the base layer 11, the adhesive layers 12, the buffer layer 13, and the insulating layer 15. The openings 19 of the base layer 11, the adhesive layers 12, the buffer layer 13, and the insulating layer 15 overlap at least partially. In at least one embodiment, the openings 19 of the base layer 11, the adhesive layers 12, the buffer layer 13, and the insulating layer 15 completely overlap to form the receiving structure 101. A raised part of the lens 20 is received in the receiving structure 101.

The base layer 11 includes a main body 111 and a first handle 112. The first handle 112 extends from the main body 111. That is, the first handle 112 closely connects with the main body 111. The lens protective film 10 can be detached from the lens 20 by pulling the first handle 112. The opening 19 of the base layer 11 is defined in the main body 111. The main body 111 is adjacent to and touches the lens 20. The first handle 112 does not touch the lens 20.

The base layer 11 can be made from insulation materials, such as silica gel (Si). The base layer 11 is capable of electrostatic shielding.

The base layer 11 may be made from a flexible material or a non-flexible material. In at least one embodiment, the base layer 11 is made from a flexible material having flexibility and ductility, and the material of the base layer 11 may be an organic material such as a silica gel (Si) material, polyimide (PI), polyethylene naphthalate two formic acid glycol ester (PEN), or polyethylene glycol terephthalate (PET). In other embodiments, the base layer 11 may also be made from a non-flexible material having a certain rigidity, and the base layer 11 may be silicon dioxide ($SiO_2$) or polycarbonate (PC).

The buffer layer 13 is formed on one surface of the base layer 11 away from the lens 20. In at least one embodiment, the buffer layer 13 is formed on the main body 111. The opening 19 of the buffer layer 13 and the opening 19 of the base layer 11 overlap at least partially. In at least one embodiment, the opening 19 of the buffer layer 13 and the opening 19 of the base layer 11 overlap completely.

The buffer layer 13 has a deep thickness and a good elastic modulus with respect to other layers. The buffer layer 13 provides good pressure resistance, impact resistance, and good physical protection for the lens 20. In at least one embodiment, the buffer layer 13 may be made from foam. In other embodiments, the buffer layer 13 may also be made from other organic materials (such as epoxy resin) or inorganic materials (such as silica gel).

The insulating layer 15 is formed on one surface of the buffer layer 13 away from the base layer 11. In at least one embodiment, the insulating layer 15 is arranged to correspond with the main body 111. The opening 19 of the buffer layer 13 and the opening 19 of the insulating layer 15 overlap at least partially. In at least one embodiment, the opening 19 of the buffer layer 13 and the opening 19 of the insulating layer 15 overlap completely. The insulating layer 15 has poor or no electrical conductivity and the insulating layer 15 may be an insulating rubber.

In at least one embodiment, the adhesive layer 12 is disposed between the base layer 11 and the buffer layer 13, and also disposed between the buffer layer 13 and the insulating layer 15. In other embodiments, the adhesive layer 12 also may be disposed between other elements to enhance the adhesion between the elements.

The adhesive layer 12 has an adhesive ability, and the material of the adhesive layer 12 may be at least one of an epoxy resin, a polyester fiber, an acrylic resin, a polyurethane, an unsaturated polyester, and an organic silica gels.

The protective layer 16 is formed on one surface of the insulating layer 15 away from the buffer layer 13. The protective layer 16 completely covers regions corresponding to the openings 19 of the base layer 11, the adhesive layer 12, the buffer layer 13, and the insulating layer 15.

The protective layer 16 is made from a transparent material having a high light transmittance. In at least one embodiment, the light transmittance of the protective layer 16 is greater than or equal to 80%. In other embodiments, the light transmittance of the protective layer 16 is greater than 93%. It can be understood that the higher the light transmittance of the protective layer 16 is, the smaller the effect of the lens protective film 10 on the lens 20 during the optical test of the lens 20 is.

In at least one embodiment, the solder mask layer 18 is detachably disposed on the outermost side of the lens protective film 10 away from the lens 20. In at least one embodiment, the solder mask layer 18 is disposed on a side of the protective layer 16 away from the insulating layer 15. The solder mask layer 18 includes a second handle 182 disposed at an edge of the solder mask layer 18. The solder mask layer 18 can be peeled off from the lens protective film 10 by pulling the second handle 182. The solder mask layer 18 can be used to prevent soldering spatters generated in the soldering process for the lens 20 from falling on the protective layer 16, and prevent the soldering spatters affecting the optical test of the lens 20. After the soldering is completed, the s solder mask layer 18 can be selectively stripped. In at least one embodiment, the solder mask layer 18 is a material that has a slight adhesion capability. The solder mask layer 18 does not need to be bonded to other components in the lens protective film 10 by additional adhesive, thereby minimizing the effect of the solder mask layer 18 on the surface of other adjacent components when the solder mask layer 18 is stripped.

The cover plate 17 has an area that is smaller than that of the first handle 112. The cover plate 17 is attached to a surface of the first handle 112 for reinforcing the first handle 112 to prevent the first handle 112 from being broken during the first handle 112 is being pulled.

FIG. 1 shows a protective film 30 of the present disclosure. The protective film 30 is formed on a lens 20. A part of the lens 20 is received in the protective film 30. The protective film 30 is used not only to prevent damage to the lens, but also to avoid dust entering into the inside of the lens during transportation. The lens 20 can be an image acquisition component suitable for a mobile terminal.

Figure 3:
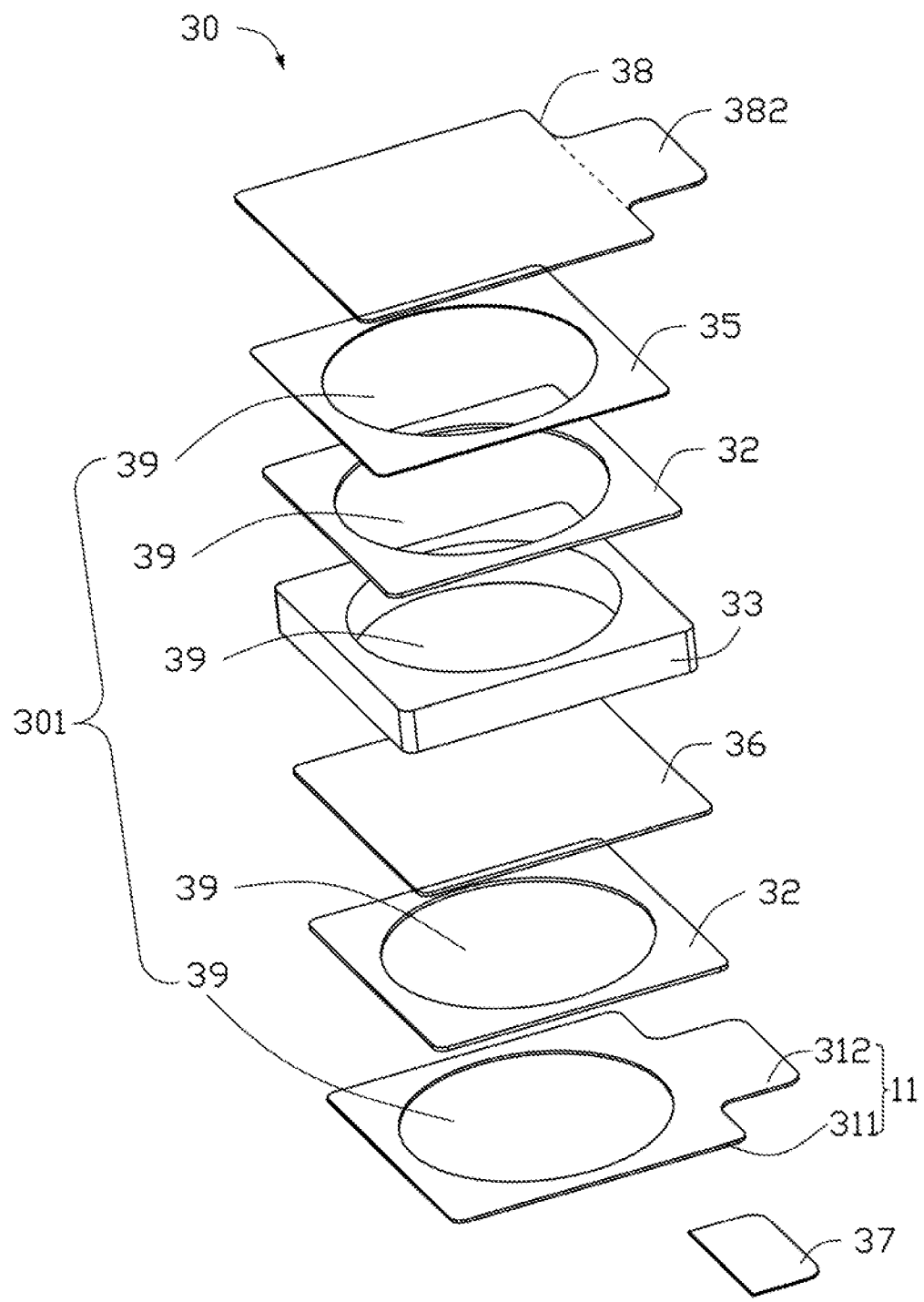
FIG. 3 is an exploded view of the lens protective film of FIG. 1 of a second embodiment according to the present disclosure.

Referring to FIG. 3, a second embodiment is shown. In this second embodiment, the protective film 30 includes a base layer 31, a protective layer 36, a buffer layer 33, an insulating layer 35, and a solder mask layer 38, laminated in that order. The protective film 30 further includes adhesive layers 32. The protective layer 36 connects to the base layer 31 by one of the adhesive layers 32. The insulating layer 35 connects to the buffer layer 33 by one of the adhesive layers 32. The protective film 30 further includes a cover plate 37 formed on one surface of the base layer 31. An opening 39 is defined in each of the base layer 31, the adhesive layers 32, the buffer layer 33, and the insulating layer 35. The openings 39 of the base layer 31, the adhesive layers 32, the buffer layer 33, and the insulating layer 35 overlap at least partially. In at least one embodiment, the openings 39 of the base layer 31, the adhesive layers 32, the buffer layer 33, and the insulating layer 35 completely overlap to form the receiving structure 301. A raised part of the lens 20 is received in the receiving structure 301.

The base layer 31 includes a main body 311 and a first handle 312. The first handle 312 extends from the main body 311. That is, the first handle 312 closely connects with the main body 311. The protective film 30 can be detached from the lens 20 by pulling the first handle 312. The opening 39 of the base layer 31 is defined in the main body 311. The main body 311 is adjacent to and touches the lens 20. The first handle 312 does not touch the lens 20.

The base layer 31 can be made from insulation materials, such as silica gel (Si). The base layer 31 is capable of electrostatic shielding.

The base layer 31 may be made from a flexible material or a non-flexible material. In at least one embodiment, the base layer 31 is a flexible material having flexibility and ductility, and the material of the base layer 31 may be made from an organic material such as a silica gel (Si) material, polyimide (PI), polyethylene naphthalate two formic acid glycol ester (PEN), or polyethylene glycol terephthalate (PET). In other embodiments, the base layer 31 may also be made from a non-flexible material having a certain rigidity, and the base layer 31 may be silicon dioxide ($SiO_2$) or polycarbonate (PC).

The protective layer 36 is formed on one surface of the base layer 31 away from the lens 20. The protective layer 36 completely covers the region corresponding to the opening 19 of the base layer 31.

The protective layer 36 is made from a transparent material having a high light transmittance. In at least one embodiment, the light transmittance of the protective layer 36 is greater than or equal to 80%. In other embodiments, the light transmittance of the protective layer 36 is greater than 93%. It can be understood that the higher the light transmittance of the protective layer 36 is, the smaller the effect of the lens protective film 10 on the lens 20 during the optical test of the lens 20 is.

Figure 4:
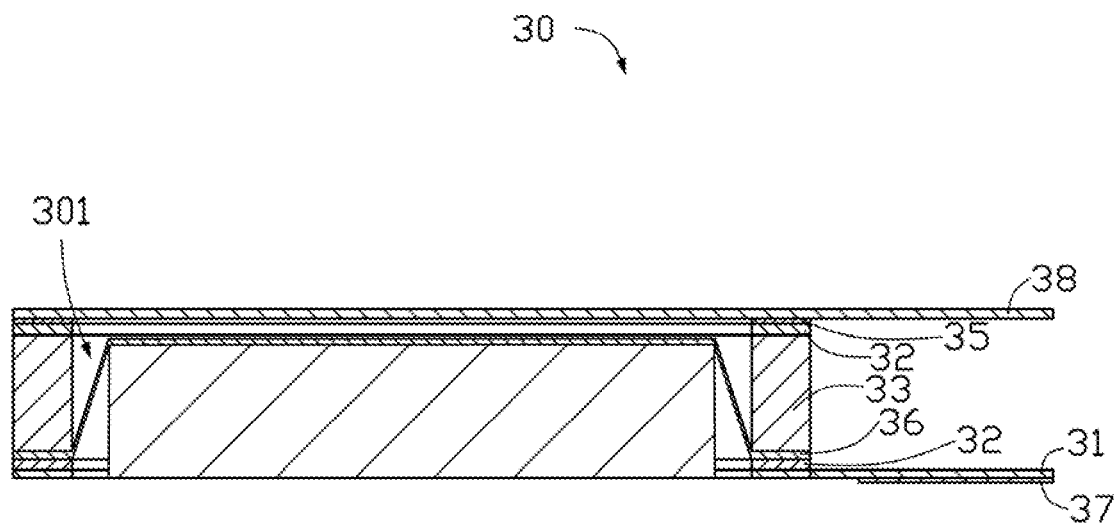
FIG. 4 is a cross-section view along line IV-IV of the lens protective film of FIG. 1 of the second embodiment.

Referring to FIG. 4, in at least one embodiment, the protective layer 36 is made from an elastic material having a high modulus of elasticity and a good deformability. When the protective film 30 is attached to the lens 20, the raised part of the lens 20 is received in the receiving structure 301. At least part of the protective layer 36 corresponding to the opening 39 of the base layer 31 is attached on at least one surface of the raised part of the lens 20. The protective layer 36 is deformed according to the depth at which the lens 20 enters the receiving structure 301.

The buffer layer 33 is formed on one surface of the protective layer 36 away from the base layer 31. In at least one embodiment, the buffer layer 33 is formed on the main body 311. The opening 39 of the buffer layer 33 and the opening 39 of the base layer 31 overlap at least partially. In at least one embodiment, the opening 39 of the buffer layer 33 and the opening 39 of the base layer 31 overlap completely.

The buffer layer 33 has a deep thickness and a good elastic modulus with respect to other layers. The buffer layer 33 provides good pressure resistance, impact resistance, and good physical protection for the lens 20. In at least one embodiment, the buffer layer 33 may be made from foam. In other embodiments, the buffer layer 33 may also be made from other organic materials (such as epoxy resin) or inorganic materials (such as silica gel).

The insulating layer 35 is formed on one surface of the buffer layer 33 away from the base layer 31. In at least one embodiment, the insulating layer 35 is arranged to correspond with the main body 311. The opening 39 of the buffer layer 33 and the opening 39 of the insulating layer 35 overlap at least partially. In at least one embodiment, the opening 39 of the buffer layer 33 and the opening 39 of the insulating layer 35 overlap completely. The insulating layer 35 has poor or no electrical conductivity and the insulating layer 35 may be an insulating rubber.

In at least one embodiment, the adhesive layer 32 is disposed between the base layer 31 and the protective layer 36, and is also disposed between the buffer layer 33 and the insulating layer 35. In other embodiments, the adhesive layer 32 also may be disposed between other elements to enhance the adhesion between the elements.

The adhesive layer 32 has an adhesive ability, and the material of the adhesive layer 32 may be at least one of an epoxy resin, a polyester fiber, an acrylic resin, a polyurethane, an unsaturated polyester, and an organic silica gels.

In at least one embodiment, the solder mask layer 38 is detachably disposed on the outermost side of the protective film 30 away from the lens 20. In at least one embodiment, the solder mask layer 38 is disposed on a side of the insulating layer 35 away from the buffer layer 33. The solder mask layer 38 includes a second handle 382 disposed at an edge of the solder mask layer 38. The solder mask layer 38 can be peeled off from the protective film 30 by pulling the second handle 382. The solder mask layer 38 can be used to prevent soldering spatters generated in the soldering process for the lens 20 from falling on the protective layer 36, and prevent the soldering spatters affecting the optical test of the lens 20. After the soldering is completed, the s solder mask layer 38 can be selectively stripped. In at least one embodiment, the solder mask layer 38 is a material that has a slight adhesion capability. The solder mask layer 38 does not need to be bonded to other components in the protective film 30 by additional adhesive, thereby minimizing the effect of the solder mask layer 38 on the surface of other adjacent components when the solder mask layer 38 is stripped.

The cover plate 37 has an area that is smaller than that of the first handle 312. The cover plate 37 is attached to a surface of the first handle 312 for reinforcing the first handle 312 to prevent the first handle 312 from being broken when the first handle 312 is pulled.

The protective film 30 of the present disclosure, the base layer 31 is disposed on a side close to the lens 20, and the first handle 312 is disposed on the base layer 31. When the protective film 30 is peeled, the buffer layer 33 and the protective layer 36 receive a thrust force along a direction away from the lens 20, rather than a pulling force. At this time, the base layer 31 is also separated from the lens 20, thereby preventing the buffer layer 33 and the protective layer 36 from being broken and generating debris when the buffer layer 33 and the protective layer 36 are tightened in a direction away from the lens 20 and in a direction of the lens 20. Moreover, by using the protective layer 36 having a high light transmittance, the lens 20 can still allow effective optical testing while the lens protective film 30 is attached on the lens 20, thereby simplifying the flow and reducing the cost. Furthermore, by providing the solder mask layer 38 on the outermost side of the lens protective film 30 away from the lens 20, the spatter-damage to the protective layer 36 is avoided, and the precision of the optical test of the lens 20 is further improved.

The embodiments shown and described above are only examples. Many details are often found in the relevant art, thus many such details are neither shown nor described. Even though numerous characteristics and advantages of the present disclosure have been set out in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims. It will therefore be appreciated that the embodiments described above can be modified within the scope of the claims.

What is claimed is:

1. A lens protective film, comprising:
   a base layer, wherein the base layer comprises a main body and a first handle extending from the main body;
   a buffer layer; and
   a protective layer; wherein the buffer layer and the protective layer are laminated on the base layer; an opening is defined in each of the main body and the buffer layer, and the openings of the main body and the buffer layer overlap to form a receiving structure for receiving a raised portion of a lens;
   a solder mask layer;
   an insulating layer; wherein the base layer, the buffer layer, the insulating layer, the protective layer, and the solder mask layer are laminated in that order, or the base layer, the protective layer, the buffer layer, the insulating layer, and the solder mask layer are laminated in that order;
   two adhesive layers, wherein the buffer layer connects to the base layer by one of the adhesive layers, and the insulating layer connects to the buffer layer by another one of the adhesive layers.

2. The lens protective film of claim 1, wherein the protective layer covers the openings of the main body and the buffer layer.

3. The lens protective film of claim 1, wherein the protective layer is made from a transparent material, and a light transmittance of the protective layer is greater than or equal to 80%.

4. The lens protective film of claim 1, wherein the solder mask layer comprises a second handle disposed at an edge of the solder mask layer.

5. A lens module, comprises:
   a lens protective film, comprising:
   a base layer, wherein the base layer comprises a main body and a first handle extending from the main body;
   a buffer layer; and a protective layer; wherein the buffer layer and the protective layer are laminated on the base layer; an opening is defined in each of the main body and the buffer layer, and the openings of the main body and the buffer layer overlap to form a receiving structure;

a solder mask layer;

an insulating layer; wherein the base layer, the buffer layer, the insulating layer, the protective layer, and the solder mask layer are laminated in that order, or the base layer, the protective layer, the buffer layer, the insulating layer, and the solder mask layer are laminated in that order;

two adhesive layers, wherein the buffer layer connects to the base layer by one of the adhesive layers, and the insulating layer connects to the buffer layer by another one of the adhesive layers; and a lens, wherein a raised portion of the lens is received in the receiving structure.

6. The lens module of claim 5, wherein the lens protective film is detachably disposed on the raised portion of the lens.

7. The lens module of claim 5, wherein the main body is adjacent to and in contact with the lens.

8. The lens module of claim 5, wherein the protective layer is made from a transparent material; a light transmittance of the protective layer is greater than or equal to 80%.

9. The lens protective film of claim 5, wherein the protective layer covers the openings of the main body and the buffer layer.

10. The lens protective film of claim 5, wherein the solder mask layer comprises a second handle disposed at an edge of the solder mask layer.

* * * * *